Sept. 8, 1931.     D. H. ROWLAND ET AL     1,822,458
MEASURING APPARATUS
Filed July 13, 1926
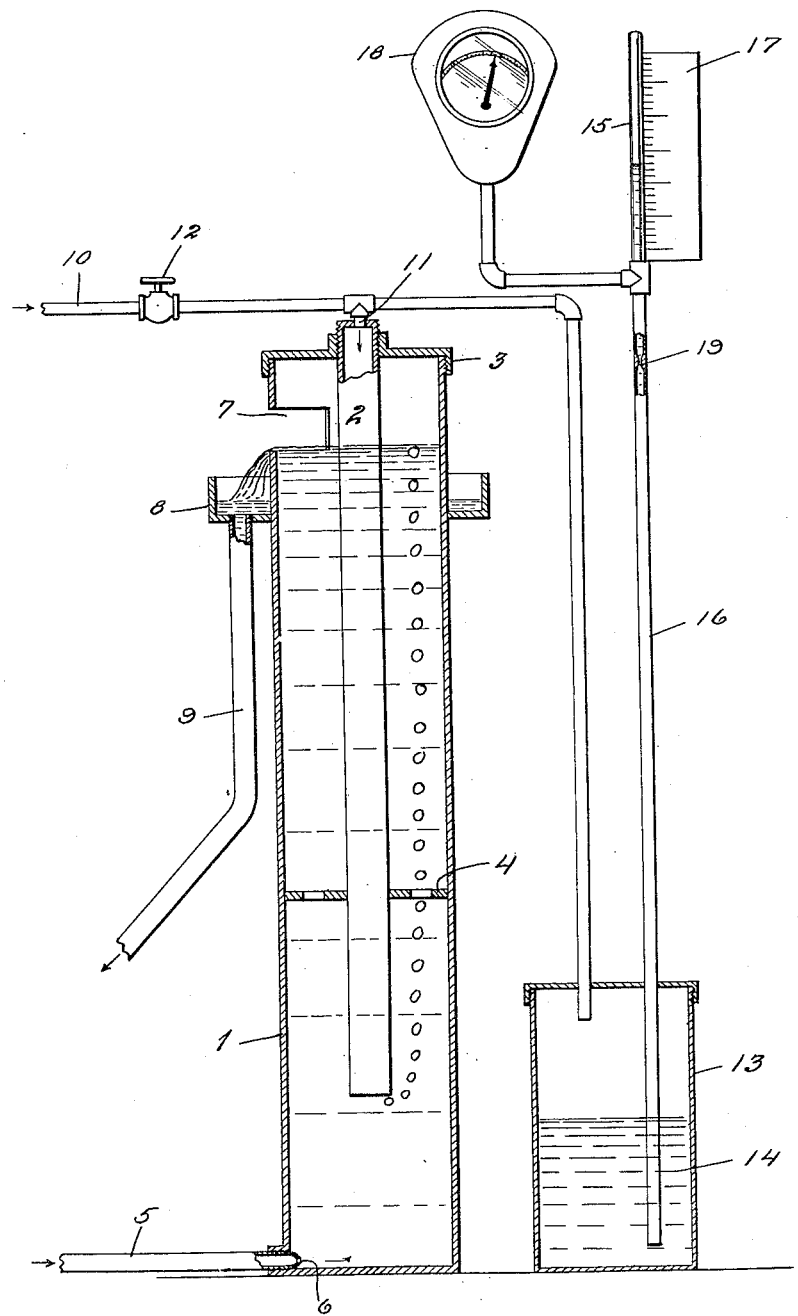

Patented Sept. 8, 1931

1,822,458

UNITED STATES PATENT OFFICE

DAVIDGE H. ROWLAND, OF BALTIMORE, AND JOHN CULLEN ROBERTSON, OF ANNAPOLIS, MARYLAND, ASSIGNORS TO LOCKE INSULATOR CORPORATION, OF BALTIMORE, MARYLAND, A CORPORATION OF MARYLAND

MEASURING APPARATUS

Application filed July 13, 1926. Serial No. 122,121.

The invention relates to measuring instruments and has particular reference to means or apparatus for indicating the density of fluent material.

The principal object of the invention, generally stated, is to provide an apparatus for giving an accurate reading as to the density of "clay slip" such as is used in the ceramic art.

In ceramic manufacture, the raw materials are mixed with water in the proper porportions to form the "clay slip". After thorough grinding in suitable mills this slip is pumped into filter presses to remove the excess water and to form the filter cake, this being the first step involved in the making of porcelain. If the manufactured product is to be uniform, it is important that this cake contain the correct percentages of ingredients, and that the moisture content, in particular, be uniform. In order to control the latter factor, it is essential that the density of the slip going into the presses be kept constant at all times.

In view of the fact that such clay slip is not a true solution, but only a mass of particles in suspension, many difficulties are encountered in measuring the density. The reasons are many, one being that the slip adheres quickly to metal and forms a viscous or sticky covering thereon. Another fact is that unless the slip be kept constantly in motion, it settles rapidly.

Various attempts have been made to design a density meter or indicator which would be suitable for the purpose, as for instance it has been attempted to weigh a constant volume of the liquid as it flows through the system. It has also been proposed to suspend a weight within the liquid and note the downward resultant. These methods are not adaptable for use in connection with clay slip on account of the tendency thereof to deposit on whatever surface contacts therewith.

It is with the above facts in view that we have designed the present invention which has for an important object the provision of density indicating means which is pneumatically operated and which acts while the slip is in a constantly moving columnar form, separating out of the solid matter from the moisture being consequently avoided.

Another object of the invention is to provide a density indicating apparatus which operates by air pressure acting against and consequently responsive to variations in the density of the constantly flowing column of slip, the employment of such pneumatic means eliminating the provision of elements upon which the slip might deposit and form a coating.

Another object of the invention is the provision of a meter of this type embodying means for increasing the scale of variations in the density, this means cooperating with the pressure means so that variations in pressure will be magnified in the instrument and the readings consequently made more accurate.

A further object of the invention is the provision of an apparatus of this character which may be readily interposed in the slip line and which will function continuously while the slip is flowing through the system.

An additional object of the invention is to provide an apparatus for this purpose or any analogous purpose, which will be simple and inexpensive to manufacture, assemble and install, positive in action, efficient and accurate in use, durable in service, and a general improvement in the art.

With the above and other objects and advantages in view, the invention preferably consists in the combination and arrangement of parts and the structural features to be hereinafter more fully described and claimed, and illustrated in the accompanying drawing in which:

The figure is a view partly in elevation and partly in section, disclosing the invention.

Referring more particularly to the drawing, we have shown the device as comprising a casing 1 of suitable size and shape within which is mounted a preferably concentrically arranged pipe 2 which may be supported in any desired manner, as for instance by means of a cap 3 on the casing and a perforated partition plate 4 extending across the casing near the lower portion thereof. Connected with the bottom of the casing 1 is a pipe or other conduit 5 which is connected with or interposed in the clay slip line. It is preferable that the pipe 5 communicate with the casing through a very small opening 6 and it is of course clear that the clay slip in the system will rise within the casing. Near its upper end the casing is shown as having a discharge opening 7 in one side so that the slip may flow out and be caught within a pan 8 or the like from whence it will flow back into the system through a pipe or other conduit 9. It is evident that there will always be a column of constant height within the casing and as the opening 6 is a small one and the slip is under high pressure, the column within the casing will be constantly agitated, it being consequently impossible for the solid matter within the slip to settle out or deposit either upon the walls of the casing or the pipe 2.

The numeral 10 designates a pipe leading from a suitable source of air pressure, and connected with this pipe is a branch 11 leading into the pipe 2, the rate of flow being variable by means of a valve 12. Air entering the pipe 2 will be opposed by the colmun of slip and will force the slip out of the pipe 2, the air escaping at the lower end and bubbling up through the column as clearly illustrated and escaping into the atmosphere. It is intended that the valve 12 be opened just sufficiently that a few bubbles of air will escape from the pipe 2 and rise through the slip. It follows that the air pressure in the pipe 2 is directly proportional to the weight of the column of slip, not considering the slight velocity and the friction head in the casing these last two mentioned factors being negligible for all practical purposes. If a pressure gauge were to be connected with the pipe 2, it would of course give a reading proportional to the density of the slip. However, a small change in density would cause an almost imperceptible change of reading on an ordinary gauge, for which reason we have provided means for magnifying or amplifying variations in scale readings.

In carrying out this feature of the invention we provide a receptacle 13 partly filled with a preferably colored liquid indicated at 14. The pipe 10 enters the top of this receptacle. We also provide a gauge glass 15 which may be mounted in any suitable manner or at any desired point and which has connected therewith a pipe 16 which extends into the liquid 14 within the container or receptacle. Adjacent the gauge glass 15 is a scale 17 which may be calibrated directly in slip density. We also provide a pressure gauge 18 connected with the gauge glass 15 for the purpose of giving a full scale deflection on, say, twelve inches of liquid within the gauge glass 15. To avoid oscillations of the liquid column within the gauge glass, it is preferable that the bore of the pipe 16 be greatly constricted at some point, as disclosed at 19.

In the operation, it will be seen, as mentioned above, that the clay slip will enter and rise within the casing 1. The valve 12 is adjusted so as to permit air pressure to enter the inner pipe 2 to such an extent as to force out the clay slip therein. There is of course air pressure upon the liquid 14 in the receptacle or container 13, and, as a consequence, the liquid will be forced up through the pipe 16 into the gauge glass 15, the level of the liquid in the glass cooperating with the scale 17 or giving a direct reading as to the density of the slip. It is of course intended that the density be uniform and it will be clear that any variation in the density will result in an increase or diminution of the pressure within the pipe 2 and receptacle 13, the liquid column within the gauge glass 15 moving correspondingly. The entire purpose of the gauge glass, pressure gauge and colored liquid container is to magnify any pressure variations so that there will be less likelihood of error in the readings. In actual practice the device has proven to be a great success and by the aid of the readings obtained it has been easily possible to proportion the ingredients of the slip so as to keep the density thereof uniform. It is really believed that the construction, operation and advantages will be readily apparent to one skilled in the art without further explanation.

While we have shown and described the preferred embodiment of the invention, it should be understood that the disclosure is merely an exemplification of the principles involved as the right is reserved to make such changes in the form, construction and arrangement of parts as will widen the field of utility and increase the adaptability of the apparatus, provided such variations constitute no departure from the spirit of the invention or the scope of the claims hereunto appended.

Having thus described the invention, we claim:

1. In an apparatus of the character described, the combination of a casing adapted to have a column of fluent material under constant pressure and of constant height passed therethrough, means for supplying air under pressure within the column, said pressure being consequently directly proportional to the weight of the column, and means for ascertaining the degree of variation in said pressure responsive to changes in density of the column.

2. In an apparatus of the character described, the combination of a conduit adapted to have a column of fluent material of constant height passed therethrough at constant velocity, means for applying pneumatic pressure upon a portion of the area of the column whereby the pressure will be directly proportional to the density of the column, and means for visually indicating variations of pressure.

3. The method of determining the density of a constantly moving column of constant length under constant pressure, consisting in opposing pneumatic pressure to the movement of the column, and measuring any variations in the pressure.

4. An apparatus for ascertaining fluctuations in the density of a mass of fluent material, comprising a conduit, means for forcing the mass of fluent material in columnar form of constant height and under constant pressure through said conduit, means for applying pneumatic pressure against a portion of the area of the top of the column to prevent movement of the mass at said area, and means for measuring variations in said pneumatic pressure.

5. In an apparatus of the character described, a conduit adapted to have a column of fluent material of constant length flow therethrough, said conduit having an inlet and an outlet, a pipe extending into the conduit longitudinally of the direction of flow therethrough, regulable means for applying pneumatic pressure through said pipe against the pressure of the fluent column, and means for measuring variations in said pneumatic pressure resulting from variations in the density of the mass.

6. In an apparatus of the character described, a conduit adapted to have a column of fluent material of constant length flow therethrough, said conduit having an inlet and an outlet, a pipe extending into the conduit longitudinally of the direction of flow therethrough, regulable means for applying pneumatic pressure through said pipe against the pressure of the fluent column, means for measuring variations in said pneumatic pressure resulting from variations in the density of the mass, comprising a liquid gauge, and means interposed between the liquid gauge and said pneumatic pressure means for giving visual indications of any variations.

7. In an apparatus of the character described, a conduit adapted to have a column of fluent material of constant length flow therethrough, said conduit having an inlet and an outlet, a pipe extending into the conduit longitudinally of the direction of flow therethrough, regulable means for applying pneumatic pressure through said pipe against the pressure of the fluent column, means for measuring variations in said pneumatic pressure resulting from variations in the density of the mass, comprising a liquid gauge, and means interposed between the liquid gauge and said pneumatic pressure means for giving visual indications of any variations, said last named means embodying means for amplifying or magnifying said indications.

In testimony whereof we affix our signatures.

DAVIDGE H. ROWLAND.
JNO. CULLEN ROBERTSON.